(12) United States Patent
Fateem et al.

(10) Patent No.: US 11,966,425 B2
(45) Date of Patent: *Apr. 23, 2024

(54) VISUAL SEARCH SYSTEM FOR FINDING TRIP DESTINATION

(71) Applicant: Uber Technologies, Inc., San Francisco, CA (US)

(72) Inventors: Karim Fateem, Belmont, CA (US); Yu Zhang, San Francisco, CA (US); Brandon Iles, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,063

(22) Filed: Nov. 2, 2022

(65) Prior Publication Data

US 2023/0297601 A1   Sep. 21, 2023

Related U.S. Application Data

(63) Continuation of application No. 17/301,510, filed on Apr. 5, 2021, now Pat. No. 11,507,606, which is a
(Continued)

(51) Int. Cl.
*G06F 3/048*      (2013.01)
*G06F 3/04815*   (2022.01)
(Continued)

(52) U.S. Cl.
CPC .......... *G06F 16/29* (2019.01); *G06F 3/04815* (2013.01); *G06F 3/0482* (2013.01);
(Continued)

(58) Field of Classification Search
CPC .... G06F 16/29; G06F 3/04815; G06F 3/0482; G06F 3/0488; G06F 16/2228;
(Continued)

(56) References Cited

U.S. PATENT DOCUMENTS

| 5,852,810 A | 12/1998 | Sotiroff et al. |
| 6,983,203 B1 | 1/2006 | Wako |

(Continued)

FOREIGN PATENT DOCUMENTS

CA    2746910 A1 *   2/2012   ............. G01C 21/26

OTHER PUBLICATIONS

"U.S. Appl. No. 16/020,267, Final Office Action dated Feb. 28, 2020", 13 pgs.
(Continued)

*Primary Examiner* — Rashawn N Tillery
(74) *Attorney, Agent, or Firm* — Schwegman Lundberg & Woessner, P.A.

(57) ABSTRACT

Systems and methods for improving a search process by providing a visual guided search experience is provided. A networked system determines a location of a user device. A user interface (UI) is presented illustrating a map at a first level view of an area based on the location. The networked system receives, via the UI, a first touch input indicating a zoom selection. In response, the UI shows a second level view of the area that includes a plurality of nodes each representing a point of interest in the area. The second level view is a lower level view than the first level view. The networked system then receives, via the UI, a second touch input selecting a node of the plurality of node. In response to the selecting of the node, navigation information for a selected point of interest corresponding to the selected node is presented.

18 Claims, 11 Drawing Sheets

Related U.S. Application Data continuation of application No. 16/020,267, filed on Jun. 27, 2018, now Pat. No. 10,990,615.

(51) Int. Cl.

| | |
|---|---|
| *G06F 3/0482* | (2013.01) |
| *G06F 3/0488* | (2022.01) |
| *G06F 16/22* | (2019.01) |
| *G06F 16/2457* | (2019.01) |
| *G06F 16/248* | (2019.01) |
| *G06F 16/29* | (2019.01) |
| *G06F 16/9535* | (2019.01) |
| *G06F 16/9537* | (2019.01) |
| *H04W 4/02* | (2018.01) |

(52) U.S. Cl.
CPC ........ *G06F 3/0488* (2013.01); *G06F 16/2228* (2019.01); *G06F 16/24578* (2019.01); *G06F 16/248* (2019.01); *G06F 16/9535* (2019.01); *G06F 16/9537* (2019.01); *H04W 4/02* (2013.01); *G06F 2203/04806* (2013.01)

(58) Field of Classification Search
CPC ............. G06F 16/24578; G06F 16/248; G06F 16/9535; G06F 16/9537; G06F 2203/04806; H04W 4/02

See application file for complete search history.

(56) References Cited

U.S. PATENT DOCUMENTS

| | | | | |
|---|---|---|---|---|
| 8,880,535 B1* | 11/2014 | Agarwal | ............... | G06F 16/583 |
| | | | | 707/748 |
| 8,954,860 B1* | 2/2015 | Hands | ..................... | G06F 16/29 |
| | | | | 715/738 |
| 9,507,749 B2* | 11/2016 | Lee | ......................... | G06Q 50/01 |
| 9,864,783 B1* | 1/2018 | Mittleman | .......... | G06F 16/9537 |
| 10,282,681 B2 | 5/2019 | Wang | | |
| 10,990,615 B2 | 4/2021 | Fateem et al. | | |
| 2003/0018427 A1* | 1/2003 | Yokota | ................. | G01C 21/367 |
| | | | | 701/455 |
| 2007/0073477 A1 | 3/2007 | Krumm et al. | | |
| 2008/0068672 A1 | 3/2008 | Nakai et al. | | |
| 2008/0104027 A1* | 5/2008 | Imler | ................. | G06F 16/9537 |
| 2008/0218523 A1 | 9/2008 | Zuverink | | |
| 2008/0320419 A1 | 12/2008 | Matas et al. | | |
| 2009/0055087 A1* | 2/2009 | Beacher | ................. | G01C 21/36 |
| | | | | 701/532 |
| 2009/0138194 A1* | 5/2009 | Geelen | ................. | G01C 21/367 |
| | | | | 701/533 |
| 2010/0088631 A1* | 4/2010 | Schiller | ................. | G06F 3/0485 |
| | | | | 715/784 |
| 2010/0106801 A1 | 4/2010 | Bliss et al. | | |
| 2011/0047509 A1* | 2/2011 | Arrasvuori | .............. | G06F 16/29 |
| | | | | 706/54 |
| 2012/0117112 A1 | 5/2012 | Johnston et al. | | |
| 2012/0316782 A1 | 12/2012 | Sartipi et al. | | |
| 2013/0151439 A1 | 6/2013 | Galaska | | |
| 2013/0321269 A1 | 12/2013 | Beaurepaire | | |
| 2013/0321466 A1* | 12/2013 | Kocienda | ............... | G01C 21/26 |
| | | | | 345/635 |
| 2014/0025296 A1 | 1/2014 | Shhimizu et al. | | |
| 2014/0282234 A1 | 9/2014 | Ku et al. | | |
| 2015/0117796 A1* | 4/2015 | Hile | ...................... | G06F 16/583 |
| | | | | 707/758 |
| 2015/0130845 A1 | 5/2015 | Otero et al. | | |
| 2015/0187107 A1* | 7/2015 | Vander Mey | .......... | G06Q 50/01 |
| | | | | 345/629 |
| 2016/0178386 A1 | 6/2016 | Schilling et al. | | |
| 2016/0320199 A1 | 11/2016 | Chen et al. | | |
| 2017/0167882 A1 | 6/2017 | Ulloa Paredes et al. | | |
| 2017/0200295 A1 | 7/2017 | Grover | | |
| 2017/0363433 A1 | 12/2017 | Tennent et al. | | |
| 2018/0017400 A1* | 1/2018 | Andrew | ............. | G01C 21/3679 |
| 2018/0322174 A1* | 11/2018 | Vasilyev | ............... | G06F 16/248 |
| 2018/0348000 A1 | 12/2018 | Cai et al. | | |
| 2018/0348010 A1* | 12/2018 | Coleman | ............ | G01C 21/3889 |
| 2018/0349413 A1* | 12/2018 | Shelby | .................. | G06F 3/0482 |
| 2018/0349451 A1* | 12/2018 | O'Connell | ......... | G01C 21/3682 |
| 2020/0004842 A1 | 1/2020 | Fateem et al. | | |
| 2020/0182646 A1 | 6/2020 | Zhu et al. | | |
| 2020/0310597 A1 | 10/2020 | Hong et al. | | |
| 2021/0172758 A1* | 6/2021 | John | ................... | G01C 21/3676 |
| 2021/0224301 A1 | 7/2021 | Fateem et al. | | |
| 2021/0364309 A1 | 11/2021 | Grigera et al. | | |

OTHER PUBLICATIONS

"U.S. Appl. No. 16/020,267, Non Final Office Action dated Jun. 10, 2020", 15 pgs.

"U.S. Appl. No. 16/020,267, Non Final Office Action dated Sep. 26, 2019", 13 pgs.

"U.S. Appl. No. 16/020,267, Notice of Allowance dated Jan. 1, 2021", 17 pgs.

"U.S. Appl. No. 16/020,267, Response filed May 27, 2020 to Final Office Action dated Feb. 28, 2020", 11 pgs.

"U.S. Appl. No. 16/020,267, Response filed Sep. 10, 2020 to Non Final Office Action dated Jun. 10, 2020", 13 pgs.

"U.S. Appl. No. 16/020,267, Response filed Dec. 26, 2019 to Non Final Office Action dated Sep. 26, 2019", 11 pgs.

"U.S. Appl. No. 17/301,510, Notice of Allowance dated Jul. 26, 2022", 9 pgs.

"U.S. Appl. No. 17/301,510, PTO Response to Rule 312 Communication dated Oct. 6, 2022", 2 pgs.

U.S. Appl. No. 16/020,267 U.S. Pat. No. 10,990,615, filed Jun. 27, 2018, Visual Search System for Finding Trip Destination.

U.S. Appl. No. 17/301,510, filed Apr. 5, 2021, Visual Search System for Finding Trip Destination.

* cited by examiner

VISUAL SEARCH SYSTEM FOR FINDING TRIP DESTINATION

CLAIM FOR PRIORITY

This application is a continuation of and claims the benefit of priority of U.S. application Ser. No. 17/301,510, filed Apr. 5, 2021, which is a continuation of and claims the benefit of priority of U.S. application Ser. No. 16/020,267, filed Jun. 27, 2018, each of which is hereby incorporated by reference in its entirety.

TECHNICAL FIELD

The subject matter disclosed herein generally relates to machines configured to the technical field of special-purpose machines for performing searches, and to the technologies by which such special-purpose machines become improved compared to other machines that perform searches. Specifically, the present disclosure addresses systems and methods to perform visual searches to identify a trip destination.

BACKGROUND

Conventionally, searches, and in particular searches for a destination, are text-based. That is, a searcher typically types in an address or name of a location that the searcher is interested in. However, text-based search systems suffer from disadvantages such as in international markets where language barriers of users (e.g., foreign travelers) or literacy problems are prevalent that make text-based search systems ineffective or difficult to use.

BRIEF DESCRIPTION OF THE DRAWINGS

Some embodiments are illustrated by way of example and not limitation in the figures of the accompanying drawings.

DETAILED DESCRIPTION

Figure 1:
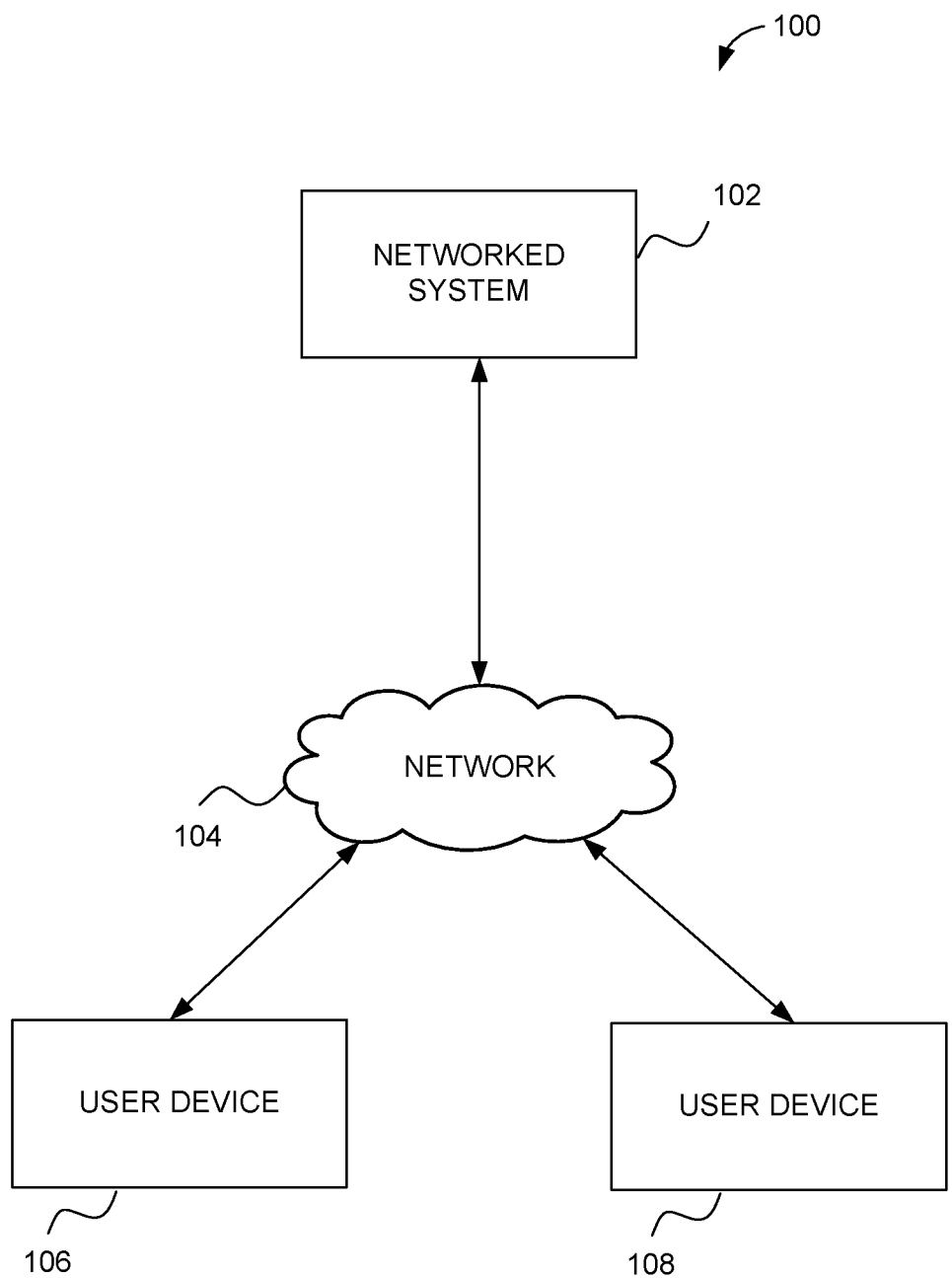
FIG. 1 is a diagram illustrating a network environment suitable for performing visual searching, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for improving a search process by providing a visual guided search experience. In example embodiments, a technical solution involves systems and methods to facilitate and perform a visual guided search to identify a destination (herein also referred to as a selected point of interest or POI) using touch inputs. Thus, in example embodiments, a user of a client application used to perform the search does not need to input any text. The systems and methods provide an intelligent solution that presents a user interface (UI) that provides the user a map, and in some embodiments, a category list through which the user filters, using touch inputs, to identify a selected POI to which the user wants to travel.

In example embodiments, a networked system, generates a geo-based category index. The geo-based category index is based on POIs that are clustered into specific categories in a specific area or region. For example, a category in the geo-based category index may be cafes within a particular neighborhood or airports within a specific area (e.g., San Francisco Bay Area). In some embodiments, the POIs used to generate the geo-based category index are determined from stored trip data obtained from devices of users of a ride sharing service. In further embodiments, the stored trip data is obtained from devices associated with a freight service, a food delivery service, or any other delivery service for people, products, or food. The stored trip data comprises information pertaining to a trip from a pick-up location to a drop-off location, whereby the pick-up location and the drop-off location are identified as POIs. In example embodiments, the geo-based category index is generated offline (e.g., prior to runtime) and is periodically updated (e.g., once a week, once a month) as the stored trip data is updated.

During runtime of a client application that performs the visual search, the networked system determines a current location of a user device of a user that is operating the client application. The networked system causes presentation, on the user device, of a user interface (UI) illustrating a map at a first level view (e.g., a maximum zoom level) of an area based on the current location of the user device. The first level view comprises a view for a given area corresponding to the current location of the device at a highest level of abstraction based on a histogram of stored trip data for the area. For example, if the histogram shows that most trips in a particular area tend to be 40 miles or less, then the first level view may be roughly a 40-mile zone with the current location situated within the zone (e.g., near a center of the zone).

The networked system then receives one or more touch inputs (e.g., on a touchscreen of the user device) that each indicate a zoom selection. The zoom selection may be a selection of a region on the map (e.g., a smaller portion of the area displayed on the first level view). For example, if the map at the first level view shows a city, the zoom selection may be a selection of a district within the city. A next subsequent zoom selection may then be a neighborhood in the selected district.

Additionally or alternatively, the zoom selection may be a selection of a category. When the user selects the category (e.g., selects an icon corresponding to the category) from a plurality of categories displayed on the UI, the networked system accesses data for the selected category in the geo-based category index based on the current location. The accessed data comprises a list of POIs in the selected category along with attributes for these POIs. The networked system then ranks the POIs in the selected category using the attributes. In example embodiments, the ranking is performed in real-time. The networked system then selects a top number of ranked POIs in the selected category and presents those POIs, as nodes, on the map. In example embodiments, the ranking of the POIs and display of corresponding nodes on the map causes a zoom in or zoom out on the map. For example, a selection of an airport category may cause a zoom out on the map to show airports in the area, whereas a selection of coffee shops may cause a zoom in to a few block radius around the current location of the user. It is noted that the nodes may also represent addresses in addition to, or as an alternative to, representing a POI.

Nodes representing POIs may be displayed at any level of zoom. In some embodiments, the POIs represent landmarks for the area (e.g., Eiffel Tower, Golden Gate Bridge). In other embodiments, the POIs displayed to the user may be based on the user's preferences or past trip history (e.g., POI is a place the user frequents such as home or work), based on popularity or frequency of selection by users of the system (e.g., based on trip data of all users over a particular time period), based on distances from the user, and/or based on POIs selected by other users starting from the same location as the user. In some embodiments, the nodes may be displayed as a three-dimensional (3-D) depiction of the POI on the map, in accordance with some embodiments.

By providing these nodes or 3-D depictions on the map, the user can visually orient themselves on the map by using nodes as landmarks for orientation. The landmarks provided are based on history (e.g., trip data) of the most frequently tripped POIs. When the user selects a node corresponding to a POI, the UI presents navigation information to the POI including pricing to travel there, an estimated time of arrival (ETA) to that POI, and/or a name of the POI. Alternatively, the user can select to be dropped off at an offset from the landmark/POI in which case, the networked system provides a visual indication of a location offset (e.g., a few hundred meters south) of the landmark/POI.

Any number of touch inputs indicating zoom selections may be received until the user finds the destination or POI to which the user wants to travel. Once that destination is identified, the user can trigger a trip request to travel to the destination by selecting, via a further touch input, the corresponding node for the destination, in accordance with some embodiments. The trip request causes the networked system to find a driver in the vicinity of the current location that is available and able to drive the user to the destination and facilitates a ride-sharing arrangement between the driver and the user.

Thus, example methods (e.g., algorithms) and example systems (e.g., special-purpose machines) are configured to improve the search process. In particular, example embodiments provide mechanisms and logic that utilizes a UI to present a map and visual elements (e.g., nodes, regions with an area, category list) through which a user can filter using touch inputs to identify a selected POI. As a result, one or more of the methodologies described herein facilitate solving the technical problem of providing a visual guided search.

FIG. 1 is a diagram illustrating a network environment 100 suitable for performing a visual guided search, according to some example embodiments. The network environment 100 includes a networked system 102 communicatively coupled via a network 104 to a plurality of user devices 106 and 108. In example embodiments, the networked system 102 comprises components that obtain, store, and analyze trip data in order to determine various zoom levels and regions for an area. The networked system 102 also generates a geo-based category index used to identify POIs relevant to the user and used to filter or zoom to a view of a region that include one or more POIs the user may be interested in traveling to. The components of the networked system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 and 108 are portable electronic devices such as smartphones, tablet devices, wearable computing devices (e.g., smartwatches), or similar devices. Alternatively, the user device 108 can correspond to an on-board computing system of a vehicle. The user devices 106 and 108 comprise one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 and 108 interact with the networked system 102 through client applications stored thereon. The client applications of the user devices 106 and 108 allow for exchange of information with the networked system 102 via user interfaces. The client applications running on the user devices 106 and 108 may also determine location information of the user devices 106 and 108 (e.g., latitude and longitude for a pick-up or a drop-off of a trip), and provide the location information to the networked system 102 for storage as part of trip data. The trip data are used by the networked system 102 to determine, for example, zoom levels, regions, POIs, and categories of POIs.

In example embodiments, a user operates the user device 106 that executes the client application to communicate with the networked system 102 to graphically search for a destination or selected POI. In some cases, the user of the user device 106 makes a request for transport or delivery service (referred to collectively as a "trip") to the selected POI. In some embodiments, the client application determines or allows the user to specify a pick-up location (e.g., of the user or an item to be delivered) for the trip. In some embodiments, the networked system 102 recommends the pick-up location and the selected POI (or multiple POIs) based on historical trip data associated with the user. In example embodiments, the client application provides a current location (e.g., coordinates such as latitude and longitude) of the user device 106 to the networked system 102.

A second user operates the user device 108 to execute a client application that communicates with the networked system 102 to exchange information associated with providing transportation or delivery service to the user of the user device 106. The client application presents information via user interfaces to the user of the user device 108, such as invitations to provide transportation or delivery service and navigation instructions. The client application also provides a current location (e.g., coordinates such as latitude and longitude) of the user device 108 to the networked system 102, whereby the current location may comprise a pick-up location or drop-off location of a POI. Depending on implementation, the current location may be a location corresponding to the current location of the user device 108 as determined automatically by a location determination module (not shown) in the user device 108. In example embodiments, the pick-up location or drop-off location corresponds to an address for a POI and is associated with coordinates (e.g., latitude and longitude) based from a location of one or more of the user devices 106 and 108 when a trip starts and/or when the trip is completed.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. While only a single networked system 102 is shown, alternative embodiments may contemplate having more than one networked systems 102 to perform server operations discussed herein for the networked system 102.

Figure 2:
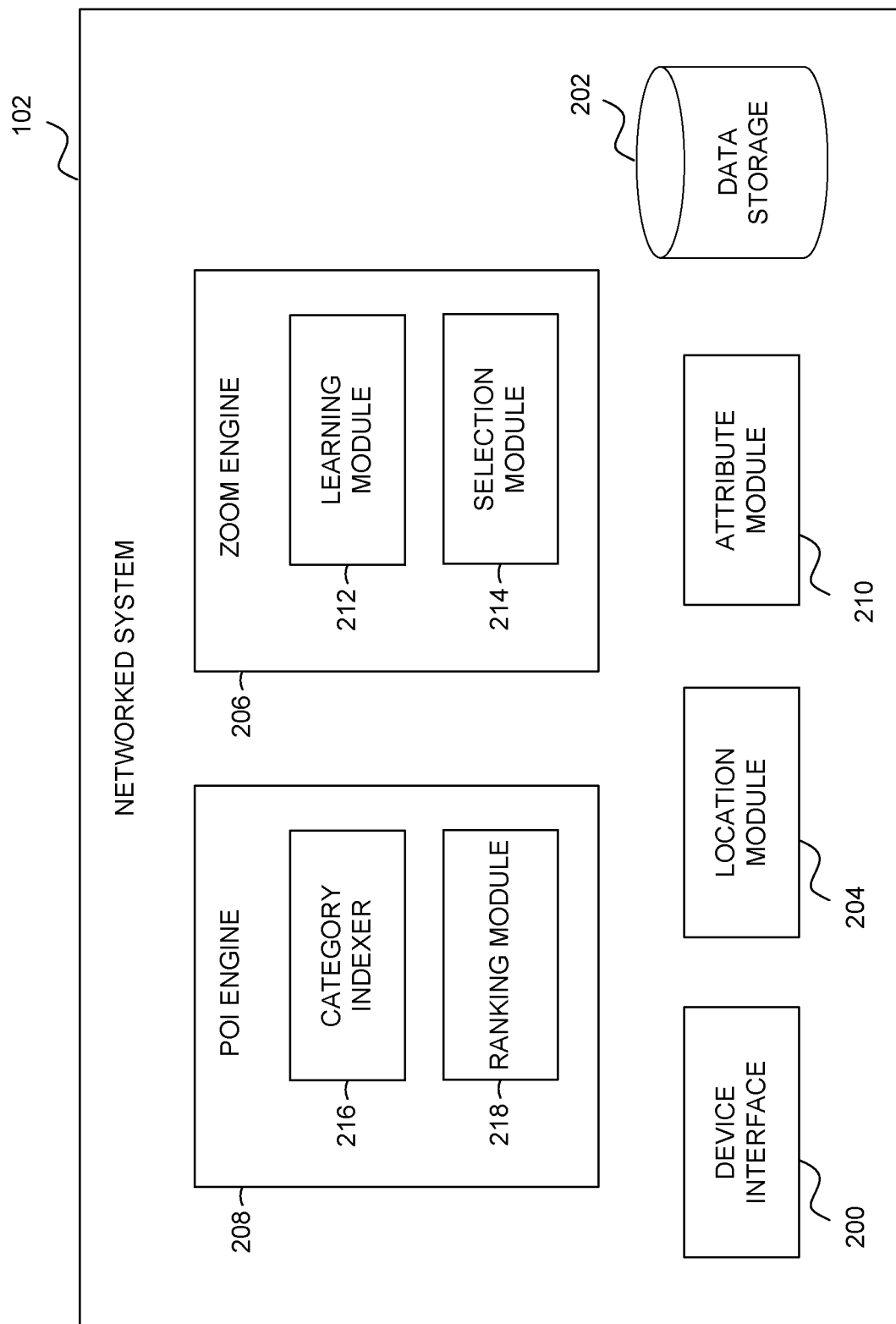
FIG. 2 is a block diagram illustrating components of a networked system, according to some example embodiments.

FIG. 2 is a block diagram illustrating components of the networked system 102, according to some example embodiments. In various embodiments, the networked system 102 obtains and stores trip data, generates and uses a geo-based category index to identify POIs that may be relevant to the user, determines zoom levels for a given area, and causes display of a user interface having a map that enables a user to identify a selected POI using touch inputs. To enable these operations, the networked system 102 comprises a device interface 200, data storage 202, a location module 204, a zoom engine 206, a POI engine 208, and an attribute module 210 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 200 is configured to exchange data with the user devices 106 and 108 and cause the presentation of one or more user interfaces used to perform the visual guided search. For example, the device interface 200 generates and transmits instructions (or the user interfaces themselves) to the user devices 106 and 108 to cause the user interfaces to be displayed on the user devices 106 and 108. The user interfaces include the interactive map used to perform the visual guided search. The device interface 200 also receives information such as locations (e.g., latitude and longitude) from the user devices 106 and 108, trip requests, touch inputs, and other trip information from the user devices (e.g., route taken, trip ratings). Each location may correspond to a POI (e.g., pick-up location or drop-off location) of a trip. Some of the information received from the user devices 106 and 108 are stored to the data storage 202 as trip data.

The data storage 202 is configured to store various data used by the networked system 102 to perform the visual guided search. For example, the data storage 202 stores trip data which comprises information pertaining to a trip from a pick-up location to a drop-off location. The data storage 202 also stores the geo-based category index that is generated from the trip data, as will be discussed in more detail below.

In some embodiments, the data storage 202 also stores regional information for each area. The regional information may include known neighborhoods that are tagged by the networked system 102 or by another system. If neighborhoods are not tagged for a given area, then a quadrant for an area may be stored. In essence, the regional information may comprise any learned geofence for the area. In some embodiments, the geofences are learned from the stored trip data.

The location module 204 determines a location of each user device 106 and 108. In some embodiments, the information received from the user devices 106 and 108 include coordinates or other location data. The location module 204 can determine, based on the location data, what area the user is located in so that a correct first level view (e.g., maximum zoom level) for the area can be presented by the device interface 200 and proper POIs for the area identified.

The zoom engine 206 manages zoom level analysis and selection of zoom levels for display on the UI. As such, the zoom engine 206 includes a learning module 212 and a selection module 214. The learning module 212 learns zoom defaults for an area based on trip data. In some embodiments, the learning module 212 analyzes stored trip data in the data storage 202 to determine average or typical trip lengths for an area. For example, in the San Francisco Bay Area, trips tend to be 40 miles or less, whereas in New York, the trips tend to be 20 miles or less. As a result, a learned zoom default for an area may be based on these typical trip lengths or ranges. In these embodiments, a first level view or maximum zoom level for an area is based on this learned zoom default (e.g., maximum zoom level for SF Bay Area is 40-mile area and for NY is 20 mile area). The learning by the learning module 212 is performed offline (e.g., prior to runtime of the client application).

The selection module 214 receives a zoom selection and determines zoom-in levels during runtime. The zoom selection may be a selection of a region on the map (e.g., a smaller portion of the area displayed at the maximum zoom level). Additionally or alternatively, the zoom selection may be a selection of a category from a category list.

Because each area, user location, and user preferences are different, the selection module 214 dynamically determines a level to zoom in (or zoom out) after each zoom selection. For example, each area will have a different density of POIs and density of neighborhoods. In example embodiments, a grid system is established for each area. The grid system may comprise a plurality of grids or cells at different zoom levels. Each cell at a higher level (e.g., level 1) may comprise a plurality of cells at a lower level (e.g., level 2 and lower). For example, level 1 for an area may be a city having a plurality of districts, level 2 is a selected region of the city, such as a district having a plurality of neighborhoods, and level 3 may be a region the district, such as a selected neighborhood.

Initially, the selection module 214 may select the learned zoom default as a first level of the grid system. In some embodiments, based on a zoom selection, the selection module 214 may select a level where no more than a predetermined number (e.g., ten) of top ranked POIs in a selected category are identified (by the POI engine 208) and displayed (as will be discussed in more detail below). If the user does not select a category, global POIs for the area or region (e.g., selected portion of the area) or POIs from a user preference of the user (e.g., based on past trip data for the user) may be provided and/or used to determine a zoom level. Global POIs comprise a predetermined number of top visited POIs in a given area or region of the area over a given period of time.

In example embodiments, the zoom levels are also based on known information for the area. For example, if neighborhoods are tagged (e.g., identified) for the area, then the selection module 214 may be able to zoom to a lower level (e.g., more detailed or magnified) view of the area, whereas if neighborhoods are not tagged, then the selection module 214 may provide less detailed regions within an area to select from (e.g., a quadrant of an area). Thus, sizes of regions within an area can vary between areas (e.g., are quite large in some areas and in other areas the regions are sparse), and the zoom level is refined based the learning and analysis of different regions and areas by the learning module 212.

The POI engine 208 manages the generation of the geo-based category index and ranking of POIs that are used by the selection module 214 for determining zoom levels. Accordingly, the POI engine 208 comprises a category indexer 216 and a ranking module 218.

The category indexer 216 generates the geo-based category index based on trip data. The generation can occur offline (e.g., before runtime of the client application). In example embodiments, the category indexer 216 clusters POIs into specific categories in a specific region or area. Thus, the category indexer 216 accesses the stored trip data in the data storage 202 for a predetermined period of time for a particular area (e.g., an area corresponding to a maximum default zoom level). The stored trip data comprises information pertaining to a plurality of trips, whereby each trip includes a pick-up location and a drop-off location that are identified as POIs. Attribute information may be known or accessed (e.g., from third party sources) for each POI to determine an associated category as well as information such as a street address. Same POIs from trips are accumulated (e.g., triggering a counter) and POIs for a same category clustered (e.g., cluster cafes, cluster hotels, cluster restaurants) for the area or region. In example embodiments, the geo-based category index is periodically updated (e.g., once a week, once a month) as the stored trip data is updated.

The ranking module 218 ranks the POIs in real time (e.g., during runtime of the client application) to determine a predetermined number of top POIs to be presented on a map provided by the device interface 200. The top POIs, based on their location, can affect the zoom level selected by the selection module 214. The ranking module 218 can rank based on the stored trip data most traveled to POIs in each category or most popular searches. The ranking module 218 can also consider trip distance (e.g., shortest distance from user), POI popularity/trend (e.g., many trips to POI in the last two hours), frequency that the user has traveled to POI in past, and other known factors to rank the POIs.

In example embodiments, the ranking module 218 also determines the categories to provide in a category list. In some instances, the user may request, via the UI, display of the category list. In response, the ranking module 218 identifies default categories or customized categories (for the area or region being displayed to the user) to include in the category list. In some embodiments, the categories are personalized to the user based on their travel or search history (e.g., categories that the user typically select, categories user goes to at a particular time of day). In further embodiments, the ranking module 218 uses heuristics to select the categories. For example, if the user is in a foreign country at an airport, the categories may include hotels, transit, and airports.

The attribute module 210 determines navigation attributes for one or more POIs to be displayed on the UI to the user. In example embodiments, the navigation attributes comprise trip information to a POI such as, for example, pricing to the POI (e.g., for a ride share service) and/or estimated-time-of-arrival (ETA) to the POI. The navigation attributes for each POI may be determined and displayed when a small number of nodes representing the POIs are displayed on the map, or navigation attributes for a particular POI is determined and displayed when a particular POI has been selected.

Figure 3:
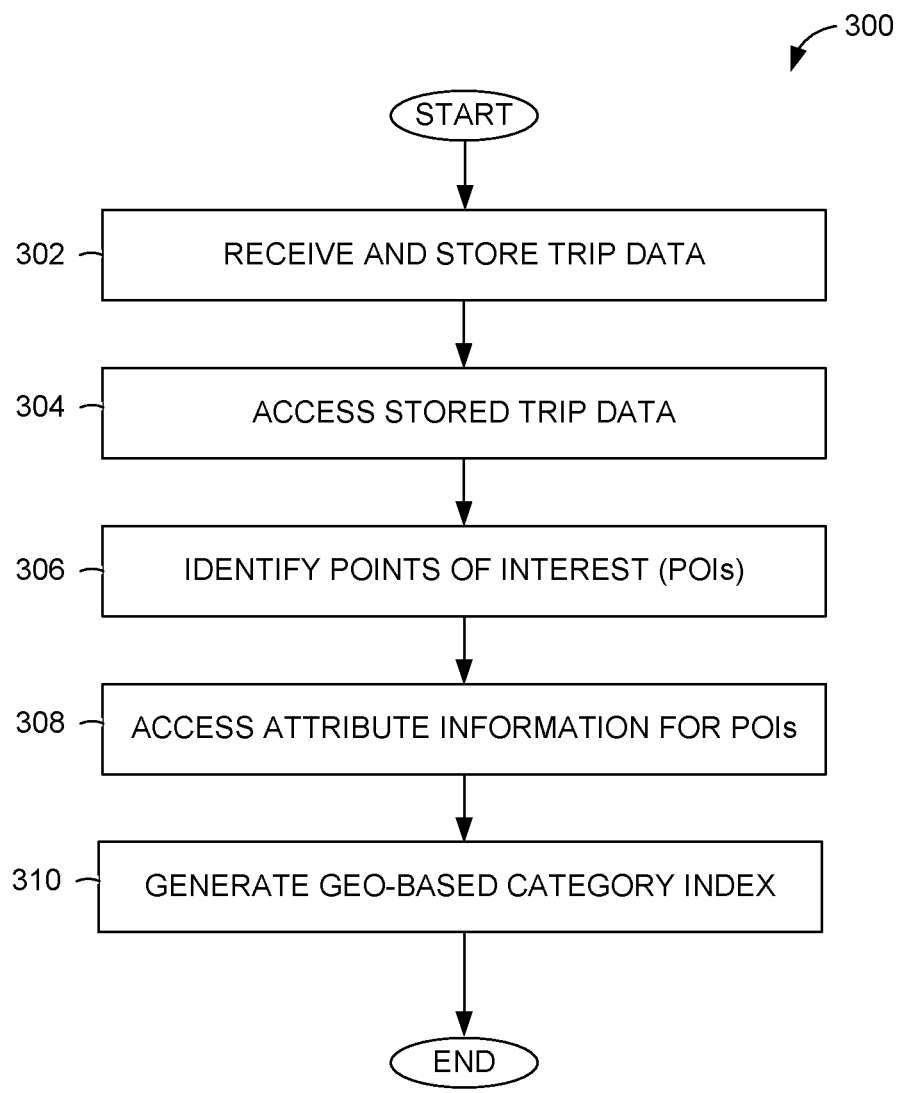
FIG. 3 is a flowchart illustrating operations of a method for generating a geo-based category index, according to some example embodiments.

FIG. 3 is a flowchart illustrating operations of a method 300 for generating a geo-based category index, according to some example embodiments. Operations in the method 300 may be performed by the networked system 102 offline (e.g., prior to runtime), using components described above with respect to FIG. 2. Accordingly, the method 300 is described by way of example with reference to the networked system 102 (e.g., the category indexer 216). However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, the networked system 102 receives and stores trip data from any user device that operates a client application associated with the networked system 102. The trip data is stored in the data storage 202 and may include searches for destinations and data for trips arranged via the client application. The data from trips include pick-up locations and drop-off locations, each of which may be a POI as well as, for example, routes taken, time spent traveling, and amount charged for each trip.

In operation 304, the category indexer 216 accesses the store trip data in the data storage 202 periodically to generate (or update) the geo-based category index. For example, the trip data may be accessed once a week to update the geo-based category index. The trip data is accessed and analyzed by the category indexer 216 area by area (e.g., for a metropolitan area, for a portion of a state, for each set of districts in a large city). The area may be determined based on the density (e.g., number of trips; number of POIs) for each area, which may, in some cases, correspond to a default zoom level for an area. For locales with a lot of POIs, the area may be smaller, whereas for areas with few POIs, the area is larger.

In operation 306, the category indexer 216 identifies the POIs from the trip data. The POIs may be associated with pick-up locations and drop-off locations.

Using the identified POIs, the category indexer 216 accesses or determines attribute information for each POI in operation 308. For example, the attribute information can be accessed from a third-party source (e.g., a website associated with the POI). In example embodiments, the attribute information indicates or includes a category for each POI.

In operation 310, the category indexer 216 generates the geo-based category index. Accordingly, the category indexer 216 accumulates a same POI from the trip data (e.g., counts the number of same POIs) and stores a count for the POI. The count is used during runtime to determine a ranking. The POIs for a particular category are then clustered by the category indexer 216. For example, the category indexer 216 clusters all cafes in a particular area, clusters all hotels in the particular area, and clusters all restaurants in the particular area.

Figure 4:
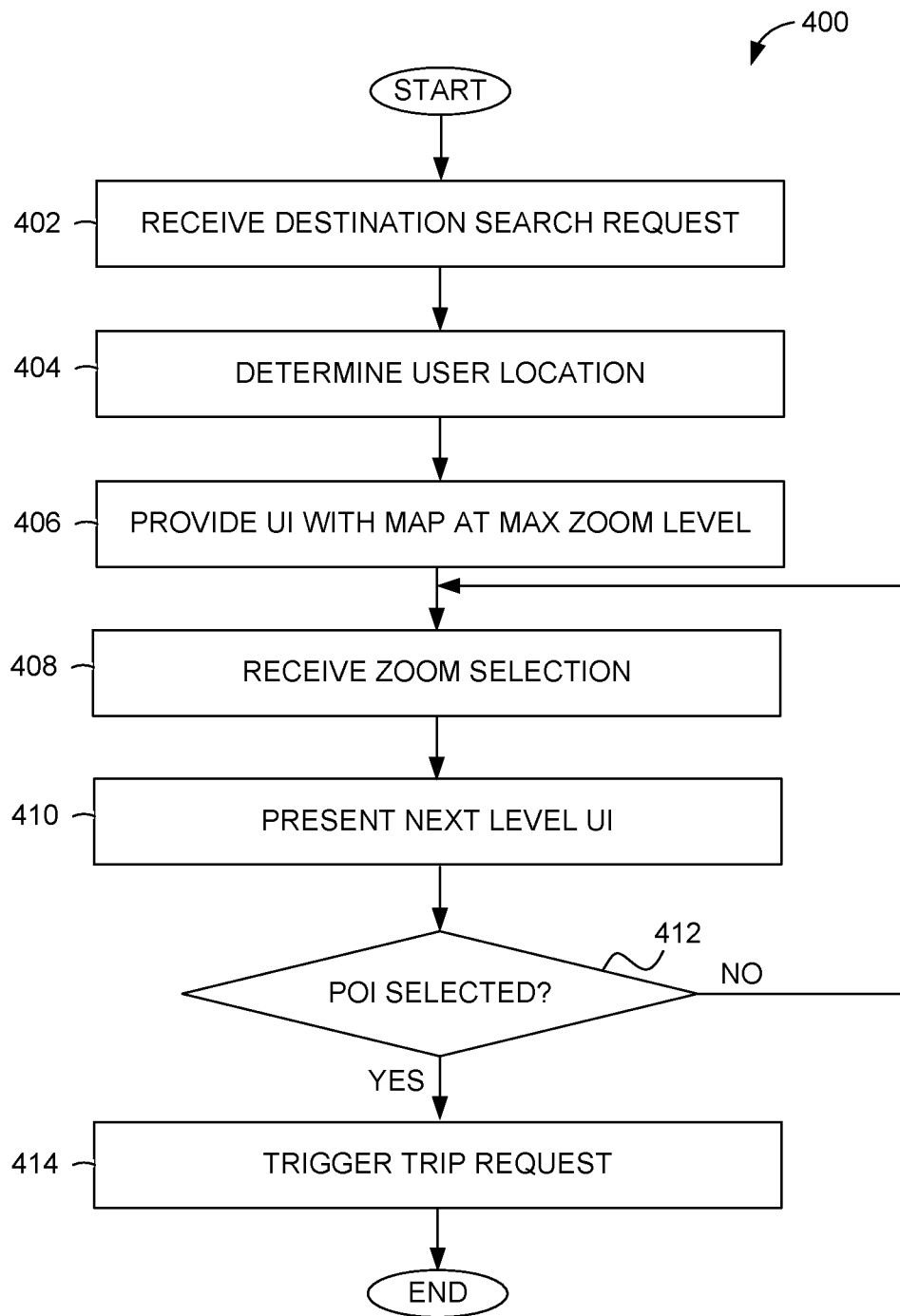
FIG. 4 is a flowchart illustrating operations of a method for performing a visual search for a destination, according to some example embodiments.

FIG. 4 is a flowchart illustrating operations of a method 400 for performing a visual search for a destination, according to some example embodiments. Operations in the method 400 may be performed by the networked system 102, using components described above with respect to FIG. 2 during runtime of the client application. Accordingly, the method 400 is described by way of example with reference to the networked system 102. However, it shall be appreciated that at least some of the operations of the method 400 may be deployed on various other hardware configurations or be performed by similar components residing elsewhere in the network environment 100. Therefore, the method 400 is not intended to be limited to the networked system 102.

In operation 402, the networked system 102 receives, via the device interface 200, a destination search request from the user device 106. For instance, the user of the user device 106 activates the client application associated with the networked system 102. This can trigger the destination search request.

In operation 404, the location module 204 determines a location of the user in response to the triggering of the destination search request. In example embodiments, the location module 204 determines the location based on location data transmitted with the destination search request in operation 402. The location is then provided to the zoom engine 206.

In operation 406, the networked system 102 provides a user interface (UI) with a map at a first level view or maximum zoom level to the user device 106 (e.g., the device interface 200 causes presentation of the UI). As discussed above, the learning module 212 of the zoom engine 206 learns zoom defaults for an area based on analysis of trip data for the area while offline. The learned zoom defaults are then stored (e.g., in the data storage 202). During runtime, the selection module 214 takes the location provided by the location module 204 and determines the maximum zoom level for the area corresponding to the location. With the identified maximum zoom level, the selection module 214 may access mapping information (e.g., stored in the data storage 202), and the device interface 200 transmits instructions including the mapping information or transmits a UI generating based on the mapping information to the client device 106 for display.

In example embodiments, the map at the maximum zoom level illustrates different regions within the area that the user can select in order to "drill down" to a lower, more detailed level. In some embodiments, a few POIs may be shown on the map. These POIs may be based on user preferences or past history. For example, the user has traveled to the POIs in the past or has traveled to the POIs at approximately the same time on various days (e.g., work in the morning, home in the evening). Nodes representing POIs that the user has traveled to in the past can be visually distinguished (e.g., highlighted, shown in a different color) from nodes for POIs that the user has not traveled to. Additionally, the POIs may be popular or trending POIs (e.g., based on histogram of trips in the area). For example, the POIs may be the most traveled to POIs in the area (e.g., landmarks, tourist attractions) or be popular POIs over a recent duration of time (e.g., 10 people have traveled there or searched for that location in the past hour).

In operation 408, the device interface 200 receives, via the UI, a zoom selection. In example embodiments, the zoom selection is a touch input applied to a touchscreen of the user device 106. The zoom selection may be a selection of a region on the map (e.g., a smaller portion of the area displayed at the maximum zoom level). Alternatively, the zoom selection may be a selection of a category from a plurality of categories displayed on the user device.

Based on the zoom selection, a next level UI (e.g., a second level view or lower level view) is presented in operation 410. Operation 410 will be discussed in more detail in connection with FIG. 5 below.

In operation 412, a determination is made by the networked system 102 whether a POI is selected. If a POI is not selection in operation 412, then the method 400 returns to operation 408 where the networked system 102 waits for a next zoom selection.

If in operation 412, a POI is selected, then a trip request is triggered in operation 414. In example embodiments, the POI is selected by a touch input placed on a node (e.g., icon) indicating the POI. In some cases, a touch input on the node of the POI first causes display of navigation information for the selected POI, and a further touch input of the POI confirms the trip request. In other cases, the navigation information may be automatically shown when a limited number of nodes are displayed on the UI, and a selection of the POI confirms the trip request. Once the trip request is confirmed, the networked system finds a driver in the vicinity of the current location that is available and able to drive the user to the destination and facilitates a ride-sharing arrangement between the driver and the user.

Figure 5:
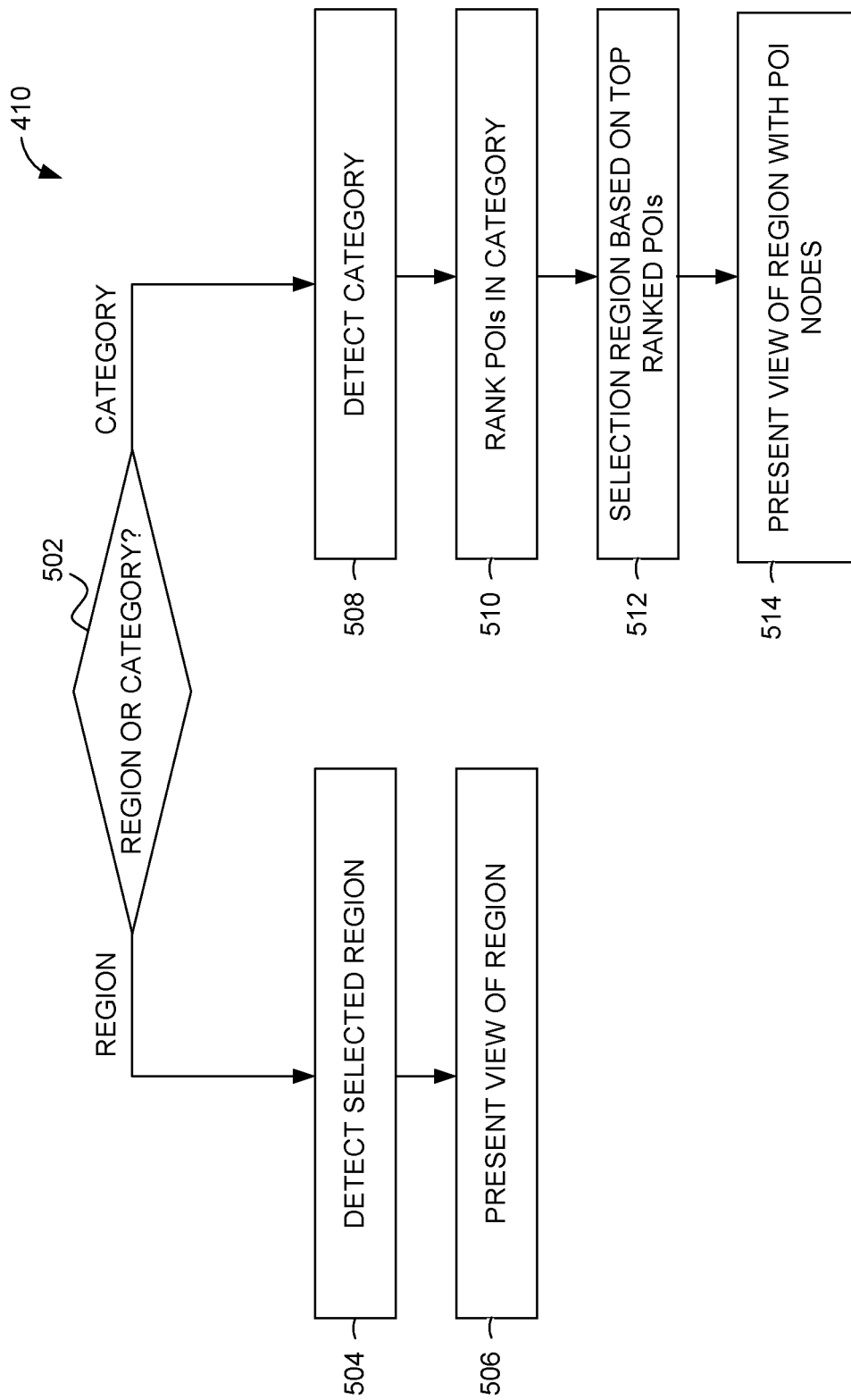
FIG. 5 is a flowchart illustrating operations for presenting a next level user interface in the visual search, according to some example embodiments.

FIG. 5 is a flowchart illustrating operations of a method 500 for presenting a next level user interface (e.g., the second level view or lower level view) in the visual search, according to some example embodiments. Operations in the method 500 may be performed by the networked system 102, using components described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, a determination is made whether the zoom selection is a selection of a region within the area of the map or a selection of a category from a category list. If the zoom selection is a selection of a region, the networked system 102 (e.g., selection module 214) detects the selected region in operation 504.

In operation 506, the device interface 200 presents a zoomed-in view of the selected region on the UI. When presenting the zoomed-in view, the selection module 214 works with the ranking module 218 to determine a set of POIs to present on the zoomed-in view in some embodiments. The ranking module 218 ranks the POIs in real time to determine a predetermined number of top POIs in the selected region to be presented. For example, the ranking module 218 can rank based on the stored trip data (e.g., most traveled to POIs in the category) or most popular searches. The ranking module 218 can also take trip distance (e.g., shortest distance from user), POI popularity (e.g., many trips to POI in the last two hours), frequency that user has traveled to POI in past, and other known factors into consideration to rank the POIs in the selected region.

Returning to operation 502, if the zoom selection is a selection of a category from a category list, the selection module 214 detects the category in operation 508. In example embodiments, the categories on the category list may be default for the area or region. Alternatively, the categories may be customized based on user preferences. For example, if the user typically searches for movie theaters, then one of the categories may be movie theaters. Further still, the categories may be selected based on a time of day. For instance, the user may go to specific places during a particular time of day (e.g., restaurants around noon) and the categories of those specific places may be in the category list (e.g., restaurants).

In operation 510, the ranking module 218 ranks the POIs in the selected category. Accordingly, the ranking module 218 accesses the geo-based category index in the selected category. Using the geo-based category index, the ranking module 218 ranks the POI based on one or more metrics such as, most traveled to POIs in the category overall or for a past duration of time, most popular searches, trip distance (e.g., shortest distance) from the user, POI popularity (e.g., many trips to POI in the last few hours), frequency that user has traveled to POIs in past, and other known factors to rank the POIs. A list of top POIs in the selected category is identified.

In operation 512, the selection module 214 selects a region based on the top ranked POIs. In example embodiments, the selection module 214 selects a level of zoom where no more than a predetermined number (e.g., 10) of top ranked POIs in a selected category are identified and displayed. Thus, taking the list of top POIs, the selection module 214 determines a region small enough to include the top POIs.

In operation 514, the device interface 200 presents a zoomed-in view of the region determined in operation 512. The zoomed-in view includes nodes representing the top POIs from the list.

Figure 6A:
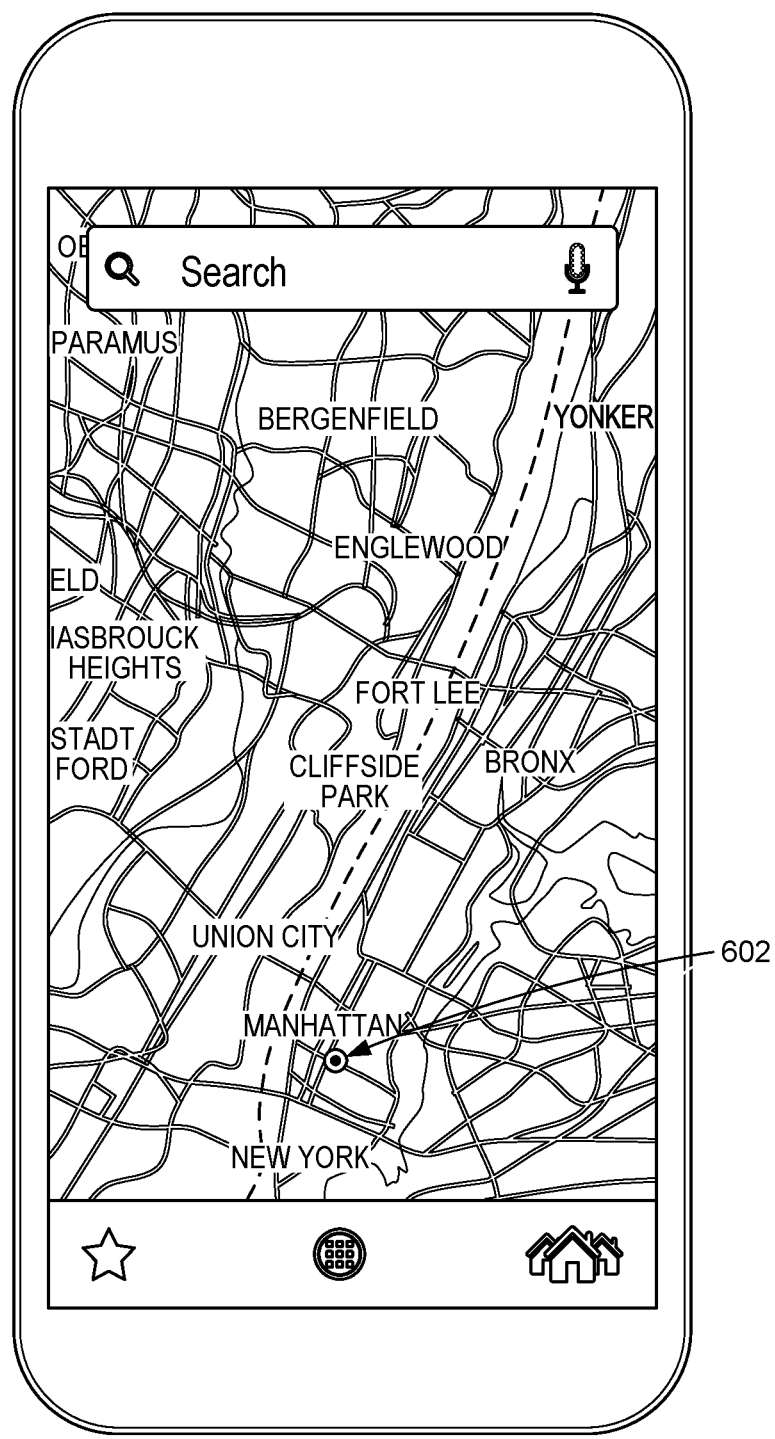
FIG. 6A-6E are example user interfaces that illustrate performance of a visual search, according to some example embodiments.

FIG. 6A-6E are example user interfaces that illustrate performance of a visual search, according to some example embodiments. FIG. 6A shows a UI at a maximum zoom level for a user that is located in Manhattan. As discussed above, the learning module 212 analyzes stored trip data in the data storage 202 to determine trip lengths for the New York area. In this example, trips in New York tend to be 20 miles or less. Therefore, the learned zoom default is 20 miles. As such, the UI shows an area of approximately 20 miles with a user location 602 indicated by a dot. In the present example, more trips and/or more POIs may be to the north of the user location 602 resulting in the area including more of a portion north of the user location.

Figure 6B:
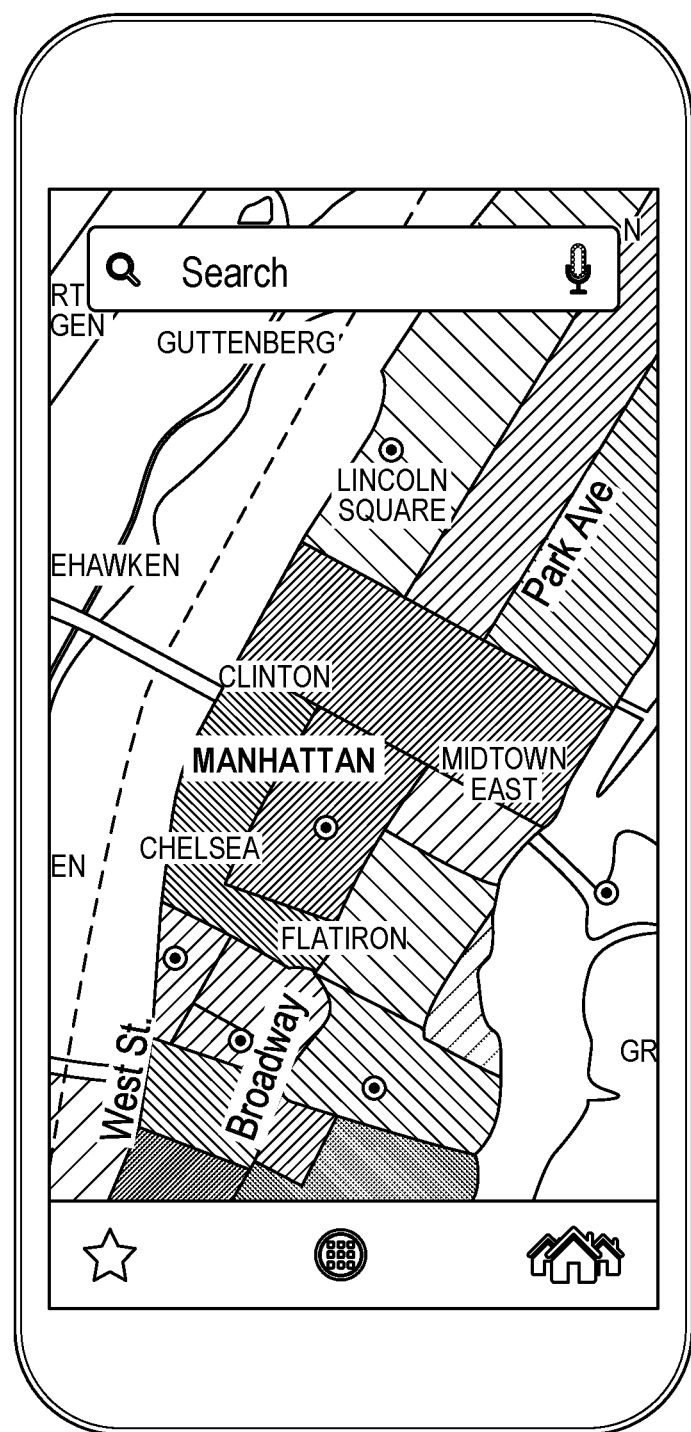

The user makes a zoom selection by touching (e.g., providing a touch input) in a region about Manhattan. In response, the selection module 214 determines a zoom level based on the zoom selection and causes the device interface 200 to present the UI shown in FIG. 6B. In the example of FIG. 6B, the region of Manhattan is further divided into smaller regions indicating various neighborhoods. In some embodiments, the smaller regions may be shown with different colors to assist a user in identifying the different regions. Additionally, nodes of POIs in the selected region are shown as dots on the UI. In some cases, the user can select a node to find out more information about the POI. The information may include name of the POI, address of the POI, distance to the POI, and/or estimate cost to travel to the POI from the user's current location.

Figure 6C:
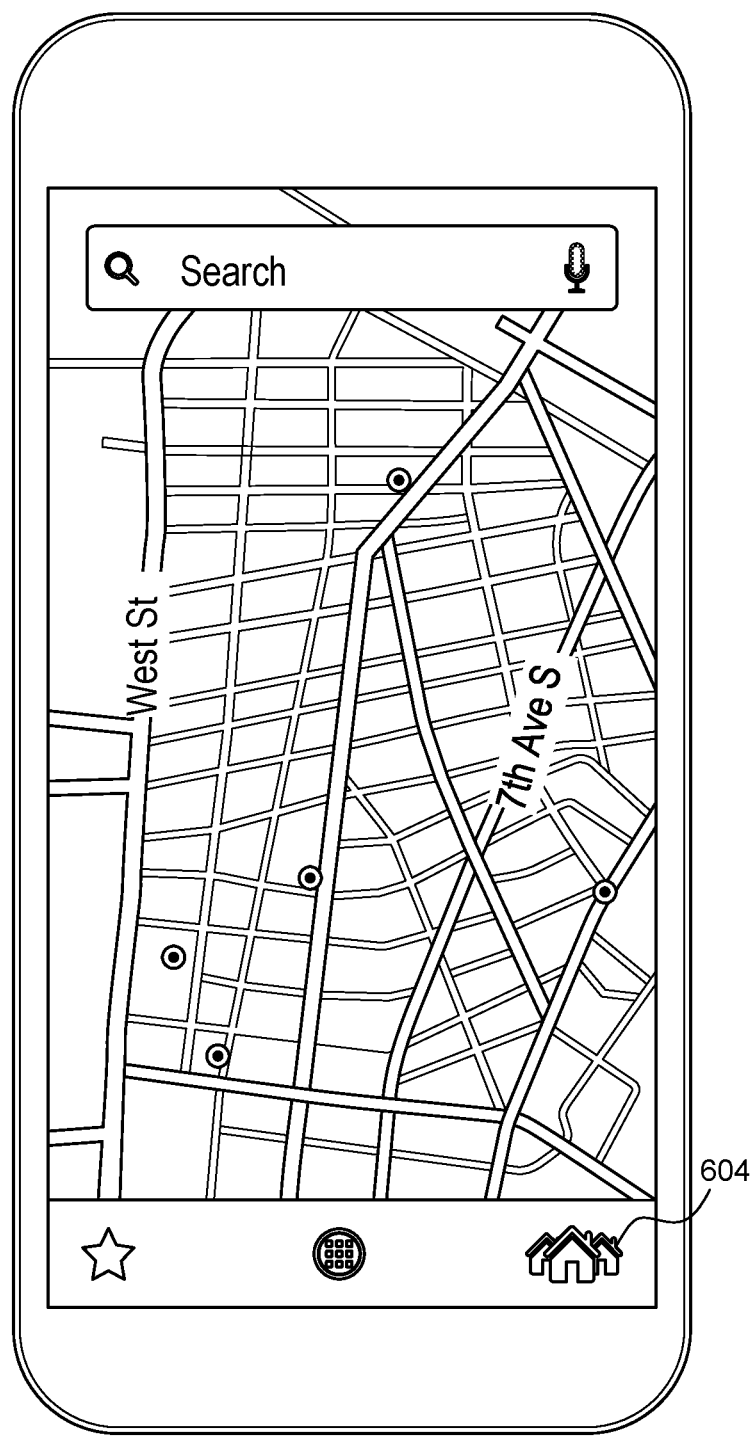

In the present example, the user makes another zoom selection by tapping (e.g., providing a touch input) on a neighborhood on the UI. In response, the selection module 214 determines a next zoom level based on the zoom selection and causes the device interface 200 to present the UI shown in FIG. 6C. In the example of FIG. 6C, the region of the selected neighborhood is shown with nodes of POIs in the selected neighborhood indicted as dots. Thus, with each selection of a smaller region, the ranking module may rank (or re-rank) the POIs for the smaller region.

Figure 6D:
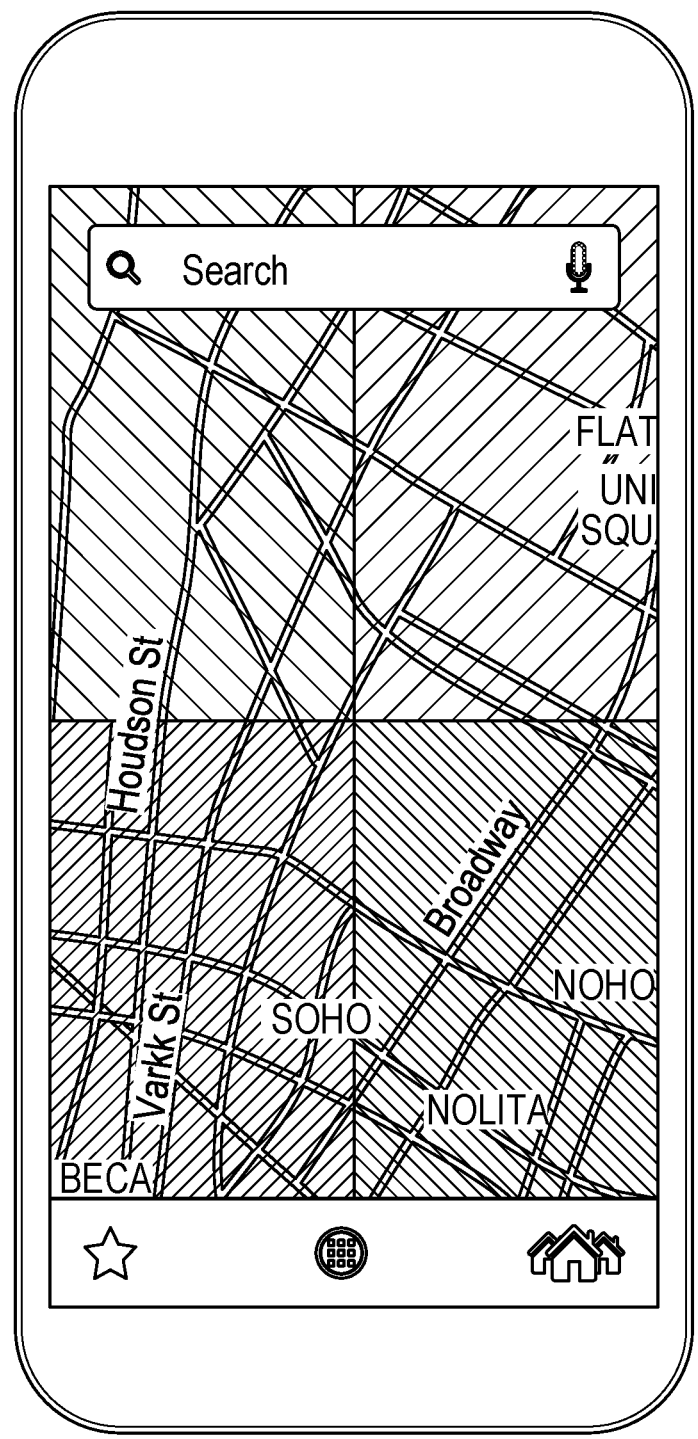

In embodiments where curated neighborhood/district data is not known or available, instead of the UI shown in FIG. 6C, the selection module 214 causes the device interface 200 to present a quadrant UI as shown in FIG. 6D. The quadrant UI may, in some cases, show a few prominent nodes. In example embodiments, the nodes may be, for example, any one or more of landmarks, POIs, addresses, street names, or district names.

Figure 6E:
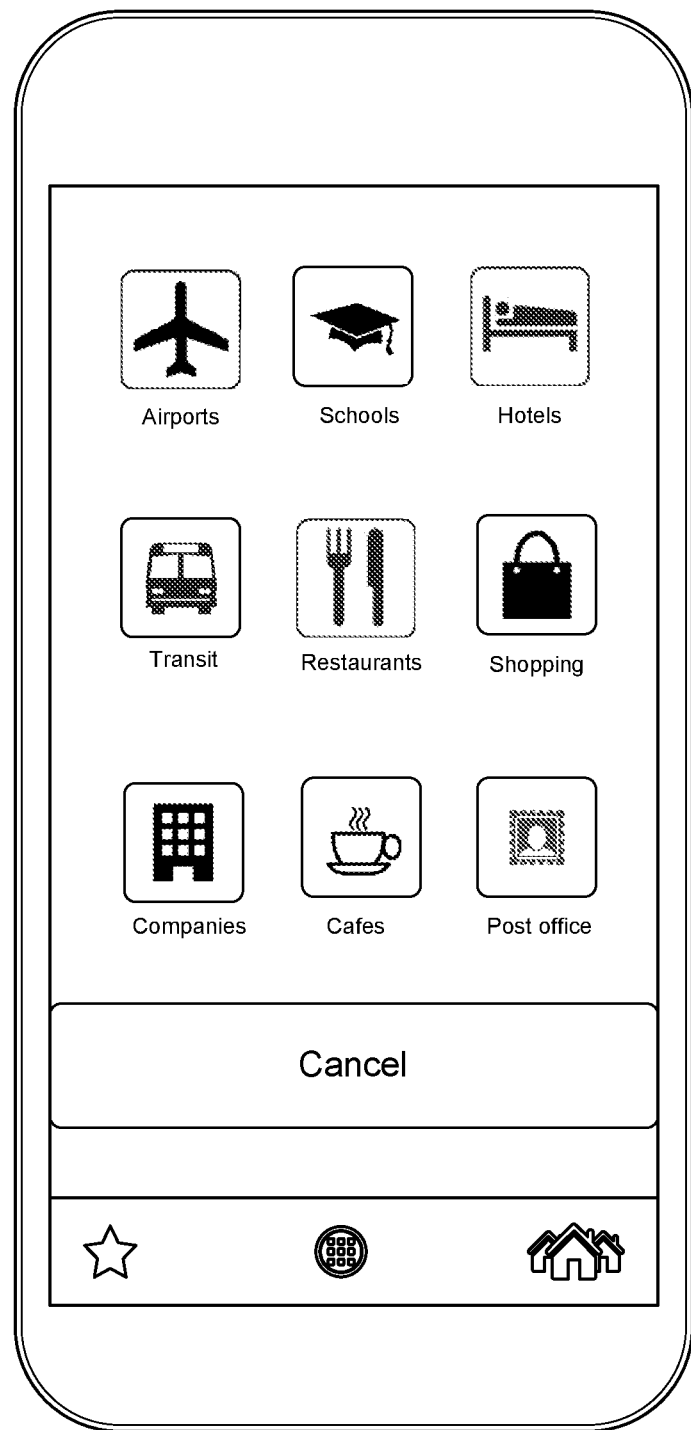

In an alternative embodiment, or at any time during zoom selections of regions, the user can access a category list by tapping on a list icon 604. When the list icon 604 is selected, the UI presents a category list as illustrated in FIG. 6E. As discussed above the categories on the category list may be based on a default for the area or region. Alternatively, the categories may be customized based on user preferences, such as categories that the user typically searches in or travels to. The user can make a zoom selection by selecting one of the categories on the category list. For example, the user can tap on a cafés icon to find cafes in the region. In response, a map shown at an appropriate zoom level is presented on the UI (e.g., the UI of FIG. 6B or FIG. 6C) with nodes representing cafes indicated.

At any point, the user can tap on a node to obtain more information about the POI. The information may include name of the POI, address of the POI, distance to the POI, and/or estimate cost to travel to the POI. The user can then tap on the node or part of the displayed information to trigger and/or confirm a trip request to the POI.

While example embodiments have been discussed with reference to the user of touch inputs for performing selections, alternative embodiments can use voice commands in addition to or in the alternative to touch inputs. For example, the user may speak "Greenwich neighborhood; show me the right top quadrant" or "Soho neighborhood; show me restaurants."

Figure 7:
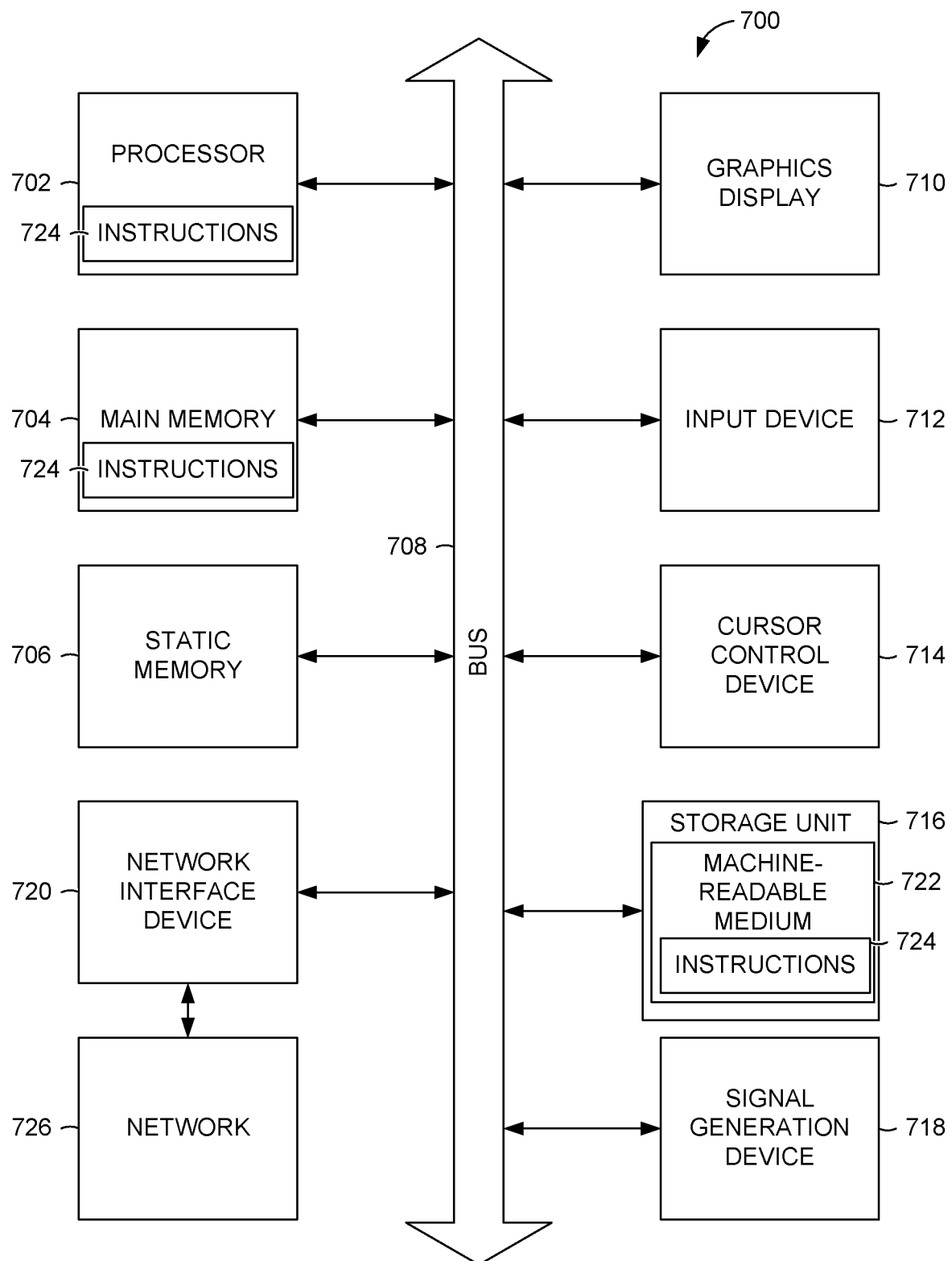
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for improving a search process by providing a visual guided search experience. The system includes one or more processors and a memory storing instructions that, when executed by the one or more hardware processors, causes the one or more hardware processors to perform operations comprising determining a location of a user device of a user; causing presentation of a user interface (UI) illustrating a map at a first level view of an area based on the location of the user device; receiving, via the UI, a first touch input indicating a zoom selection that causes the UI to zoom into a second level view of the area, the second level view being a lower level view than the first level view; in response to the zoom selection, causing presentation of the UI showing the second level view of the area that includes a plurality of nodes, each node of the plurality of nodes representing a point of interest in the area; receiving, via the UI, a second touch input selecting a node of the plurality of nodes; and in response to the selecting of the node, causing presentation of navigation information for a selected point of interest corresponding to the selected node.

In example 2, the subject matter of example 1 can optionally include generating a geo-based category index, the generating comprising clustering, within a region, points of interest in a same category.

In example 3, the subject matter of examples 1-2 can optionally include wherein the receiving the first touch input indicating the zoom selection comprises receiving a selection of a category from a plurality of categories, and the operations further comprise: accessing data for the selected category from the geo-based category index based on the current location; ranking points of interest in the selected category; and selecting a top number of ranked points of interest in the selected category, the plurality of nodes representing the top number of ranked points of interest.

In example 4, the subject matter of examples 1-3 can optionally include wherein the category comprises top points of interest in at least a portion of the area.

In example 5, the subject matter of examples 1-4 can optionally include wherein the receiving the first touch input indicating the zoom selection comprises receiving a selection of a defined region of the map, wherein the second level view comprises a view of the defined region.

In example 6, the subject matter of examples 1-5 can optionally include wherein the first level view of an area is at a maximum zoom level and is determined from a histogram generated from stored trip data for the area.

In example 7, the subject matter of examples 1-6 can optionally include wherein the navigation information for the selected point of interest comprises an estimate time of arrival at the selected point of interest and a cost to travel to the selected point of interest.

In example 8, the subject matter of examples 1-7 can optionally include wherein one or more of the plurality of nodes is displayed on the user interface as a three-dimensional depiction of a corresponding point of interest.

Example 9 is a method for improving a search process by providing a visual guided search experience. The method comprises determining, by a hardware processor, a location of a user device of a user; causing presentation of a user interface (UI) illustrating a map at a first level view of an area based on the location of the user device; receiving, via the UI, a first touch input indicating a zoom selection that causes the UI to zoom into a second level view of the area, the second level view being a lower level view than the first level view; in response to the zoom selection, causing presentation of the UI showing the lower level view of the area that includes a plurality of nodes, each node of the plurality of nodes representing a point of interest in the area; receiving, via the UI, a second touch input selecting a node of the plurality of nodes; and in response to the selecting of the node, causing presentation of navigation information for a selected point of interest corresponding to the selected node.

In example 10, the subject matter of example 9 can optionally include generating a geo-based category index, the generating comprising clustering, within a region, points of interest in a same category.

In example 11, the subject matter of examples 9-10 can optionally include wherein the receiving the first touch input indicating the zoom selection comprises receiving a selection of a category from a plurality of categories, and the method further comprises accessing data for the selected category from the geo-based category index based on the current location; ranking points of interest in the selected category; and selecting a top number of ranked points of interest in the selected category, the plurality of nodes representing the top number of ranked points of interest.

In example 12, the subject matter of examples 9-11 can optionally include wherein the category comprises top points of interest in at least a portion of the area.

In example 13, the subject matter of examples 9-12 can optionally include wherein the receiving the first touch input indicating the zoom selection comprises receiving a selection of a defined region of the map, wherein the second level view comprises a view of the defined region.

In example 14, the subject matter of examples 9-13 can optionally include wherein the first level view of an area is at a maximum zoom level and is determined from a histogram generated from stored trip data for the area.

In example 15, the subject matter of examples 9-14 can optionally include wherein the navigation information for the selected point of interest comprises an estimate time of arrival at the selected point of interest and a cost to travel to the selected point of interest.

In example 16, the subject matter of examples 9-15 can optionally include wherein one or more of the plurality of nodes is displayed on the user interface as a three-dimensional depiction of a corresponding point of interest.

In example 17, the subject matter of examples 9-16 can optionally include wherein the causing presentation of the UI showing the second level view of the area that includes a plurality of nodes comprises causing presentation of a quadrant UI based on a lack of curated neighborhood data.

Example 18 is a machine-storage medium for improving a search process by providing a visual guided search experience. The machine-storage medium configures one or more processors to perform operations comprising determining a location of a user device of a user; causing presentation of a user interface (UI) illustrating a map at a first level view of an area based on the location of the user device; receiving, via the UI, a first touch input indicating a zoom selection that causes the UI to zoom into a second level view of the area, the second level view being a lower level view than the first level view; in response to the zoom selection, causing presentation of the UI showing the second level view of the area that includes a plurality of nodes, each node of the plurality of nodes representing a point of interest in the area; receiving, via the UI, a second touch input selecting a node of the plurality of nodes; and in response to the selecting of the node, causing presentation of navigation information for a selected point of interest corresponding to the selected node.

In example 19, the subject matter of example 18 can optionally include wherein the operations further comprise generating a geo-based category index, the generating comprising clustering, within a region, points of interest in a same category.

In example 20, the subject matter of examples 18-19 can optionally include wherein the first level view of an area is at a maximum zoom level and is determined from a histogram generated from stored trip data for the area.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   determining, by one or more processors, a location of a user device of a user;
   causing presentation of a user interface (UI) illustrating a map at a first level of an area based on the location of the user device and including an indication of the location of the user device on the map, the first level of the area being sized to a zone equal to a distance within which a majority of trips take place for the area;
   in response to receiving a request to access a category list, causing presentation of the category list on the UI;
   receiving, via the UI, a selection of a category from the category list, the selection of the category being a zoom input applied to a touchscreen of the user device;
   based on the selection of the category, causing presentation of the UI showing a second level that is a zoomed in view of the first level, the second level being sized to include a predetermined number of top points of interests (POIs) in the selected category;

receiving, via the UI, a further zoom input applied to the touchscreen that selects a node displayed on the UI; and based on the selected node, causing presentation of navigation information for a point of interest corresponding to the selected node.

2. The method of claim 1, further comprising:

analyzing stored trip data to determine average trip lengths for each area and a distance within which a majority of trips take place for each area.

3. The method of claim 2, wherein the analyzing stored trip data to determine average trip lengths comprises machine learning a zoom default for each area based on average or typical trip lengths for each area.

4. The method of claim 1, further comprising:

establishing a grid system for each area that comprises a plurality of cells at different levels, each first level cell at the first level comprising one or more second level cells at the second level.

5. The method of claim 1, wherein a higher distribution of trips in a particular direction results in a larger portion of the area in the particular direction being shown in the UI.

6. The method of claim 5, wherein the indication of the location of the user device is positioned off center on the UI based on the higher distributions of trips in the particular direction.

7. The method of claim 1, wherein the causing presentation of the UI showing the second level of the area comprises causing presentation of a quadrant of the area based on a lack of curated neighborhood data, the presentation of the quadrant of the area providing less details than a presentation of a curated neighborhood.

8. The method of claim 1, further comprising:

generating a geo-based category index, the generating comprising clustering, within a region, points of interest in a same category.

9. The method of claim 8, further comprising, based on the selection of the category:

accessing data for the selected category from the geo-based category index based on the location of the user device;

ranking points of interest in the selected category; and selecting the predetermined number of POIs in the selected category for presentation.

10. A system comprising:

one or more hardware processors; and a memory storing instructions that, when executed by the one or more hardware processors, causes the one or more hardware processors to perform operations comprising:

analyzing stored trip data to determine average trip lengths for each area and a distance within which a majority of trips take place for each area;

determining a location of a user device of a user;

causing presentation of a user interface (UI) illustrating a map at a first level of an area based on the location of the user device and including an indication of the location of the user device on the map;

in response to receiving a request to access a category list, causing presentation of the category list on the UI;

receiving, via the UI, a selection of a category from the category list, the selection of the category being a zoom input applied to a touchscreen of the user device;

based on the selection of the category, causing presentation of the UI showing a second level that is a zoomed in view of the first level, the second level being sized to include a predetermined number of top points of interests (POIs) in the selected category;

receiving, via the UI, a further zoom input applied to the touchscreen that selects a node displayed on the UI; and based on the selected node, causing presentation of navigation information for a point of interest corresponding to the selected node.

11. The system of claim 10, wherein the first level of the area is sized to a zone equal to a distance within which the majority of trips takes place for the area.

12. The system of claim 10, wherein the operations further comprise:

establishing a grid system for each area that comprises a plurality of cells at different levels, each first level cell at the first level comprising one or more second level cells at the second level.

13. The system of claim 10, wherein a higher distribution of trips in a particular direction results in a larger portion of the area in the particular direction being shown in the UI.

14. The system of claim 13, wherein the indication of the location of the user device is positioned off center on the UI based on the higher distributions of trips in the particular direction.

15. The system of claim 10, wherein the causing presentation of the UI showing the second level of the area comprises causing presentation of a quadrant of the area based on a lack of curated neighborhood data, the presentation of the quadrant of the area providing less details than a presentation of a curated neighborhood.

16. The system of claim 10, wherein the operations further comprise:

generating a geo-based category index, the generating comprising clustering, within a region, points of interest in a same category.

17. The system of claim 16, wherein the operations further comprise, based on the selection of the category:

accessing data for the selected category from the geo-based category index based on the location of the user device;

ranking points of interest in the selected category; and selecting the predetermined number of POIs in the selected category for presentation.

18. A machine-storage medium storing instructions that, when executed by one or more processors of a machine, cause the one or more processors to perform operations comprising:

determining a location of a user device of a user;

causing presentation of a user interface (UI) illustrating a map at a first level of an area based on the location of the user device and including an indication of the location of the user device on the map, a higher distribution of trips in a particular direction resulting in a larger portion of the area in the particular direction being shown in the UI;

in response to receiving a request to access a category list, causing presentation of the category list on the UI;

receiving, via the UI, a selection of a category from the category list, the selection of the category being a zoom input applied to a touchscreen of the user device;

based on the selection of the category, causing presentation of the UI showing a second level that is a zoomed in view of the first level, the second level being sized to include a predetermined number of top points of interests (POIs) in the selected category;

receiving, via the UI, a further zoom input applied to the touchscreen that selects a node displayed on the UI; and based on the selected node, causing presentation of navigation information for a point of interest corresponding to the selected node.

\* \* \* \* \*